US008743099B2

(12) United States Patent
Lin

(10) Patent No.: US 8,743,099 B2
(45) Date of Patent: Jun. 3, 2014

(54) DISPLAY ADJUSTING DEVICE AND DISPLAY ADJUSTING METHOD

(75) Inventor: Margaret-Peyi Lin, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 231 days.

(21) Appl. No.: 13/316,581

(22) Filed: Dec. 12, 2011

(65) Prior Publication Data

US 2013/0082991 A1 Apr. 4, 2013

(30) Foreign Application Priority Data

Oct. 4, 2011 (TW) ............................ 100135971 A

(51) Int. Cl.
*G06F 3/038* (2013.01)

(52) U.S. Cl.
USPC ............................ 345/207; 345/102; 345/214

(58) Field of Classification Search
None
See application file for complete search history.

(56) References Cited

U.S. PATENT DOCUMENTS 7,583,253 B2 * 9/2009 Jeng et al. .................... 345/156
2011/0181541 A1 * 7/2011 Kuo .............................. 345/174

FOREIGN PATENT DOCUMENTS

TW 200727101 7/2007
TW 201126298 8/2011

OTHER PUBLICATIONS

Office action mailed on Nov. 20, 2013 for the Taiwan application No. 100135971, filed: Oct. 4, 2011, p. 1 line 13~14, p. 2 line 1~3 and line 7~26, p. 3~4, p. 5 line 1~6 and line 10~12 and search report.

* cited by examiner

*Primary Examiner* — Sumati Lefkowitz
*Assistant Examiner* — Douglas M Wilson
(74) *Attorney, Agent, or Firm* — Winston Hsu; Scott Margo

(57) ABSTRACT

A display adjusting device adapted for adjusting display parameter(s) of a display unit includes a light sensing unit for sensing an environmental illumination associated with the display unit; an image capturing unit for capturing an image of a user in front of the display unit; and a controlling unit, electrically connected to the display unit, the light sensing unit and the image capturing unit, for selectively adjusting a first display brightness of the display unit to a second display brightness according to the environmental illumination, calculating a distance between eyes of the user and the display unit according to the image, and selectively adjusting the second display brightness to a third display brightness according to the distance.

14 Claims, 4 Drawing Sheets

DISPLAY ADJUSTING DEVICE AND DISPLAY ADJUSTING METHOD

BACKGROUND OF THE INVENTION

1. Field of the Invention

The invention relates to a display adjusting device and a display adjusting method and, more particularly, to a display adjusting device and a display adjusting method capable of adjusting display parameter(s) of a display unit according to environmental illumination and distance between eyes of a user and the display unit.

2. Description of the Prior Art

As technology developed and advanced, more and more electronic devices, such as personal computer, notebook, tablet computer, mobile phone, personal digital assistant, and so on, have been involved in human daily life. Due to job or entertainment request, people usually spend a lot of time to watch a display of an electronic device under many situations. In general, various display parameters of the display (e.g. display brightness, color contrast, etc.) can be adjusted manually by the user based on his/her demand. However, most of the users usually cannot adjust the display parameters precisely to a best mode. After watching the display for a long time, eyes of the user may get tired easily, even get permanent injury.

SUMMARY OF THE INVENTION

The invention provides a display adjusting device and a display adjusting method capable of adjusting display parameter(s) of a display unit according to environmental illumination and distance between eyes of a user and the display unit, so as to solve the aforesaid problems.

According to the claimed invention, a display adjusting device is adapted for adjusting display parameter(s) of a display unit. The display adjusting device comprises a light sensing unit for sensing an environmental illumination associated with the display unit; an image capturing unit for capturing an image of a user in front of the display unit; and a controlling unit, electrically connected to the display unit, the light sensing unit and the image capturing unit, for selectively adjusting a first display brightness of the display unit to a second display brightness according to the environmental illumination, calculating a distance between eyes of the user and the display unit according to the image, and selectively adjusting the second display brightness to a third display brightness according to the distance.

According to the claimed invention, the controlling unit adjusts a color contrast of the display unit by a ratio of the third display brightness to the first display brightness.

According to the claimed invention, the controlling unit judges whether the distance is larger than a first threshold or smaller than a second threshold, the first threshold is larger than the second threshold; the controlling unit judges that the second display brightness is smaller than or equal to a maximum display brightness when the distance is larger than the first threshold, the third display brightness is equal to the second display brightness when the second display brightness is equal to the maximum display brightness, the third display brightness is larger than the second display brightness when the second display brightness is smaller than the maximum display brightness; the controlling unit judges that the second display brightness is larger than or equal to a minimum display brightness when the distance is smaller than the second threshold, the third display brightness is equal to the second display brightness when the second display brightness is equal to the minimum display brightness, the third display brightness is smaller than the second display brightness when the second display brightness is larger than the minimum display brightness; the third display brightness is equal to the second display brightness when the distance is between the first threshold and the second threshold.

According to the claimed invention, the display adjusting device further comprises a memory unit, electrically connected to the controlling unit, for storing a look-up table, wherein the look-up table records N predetermined environmental illumination and N predetermined display brightness, N is a positive integer, each of the N predetermined environmental illumination is corresponding to one of the N predetermined display brightness, the controlling unit compares the environmental illumination with the N predetermined environmental illumination of the look-up table so as to select the second display brightness from the N predetermined display brightness of the look-up table.

According to the claimed invention, the look-up table further records N levels, each of the N levels is corresponding to one of the N predetermined environmental illumination and one of the N predetermined display brightness, the minimum display brightness is corresponding to a first level of the N levels, the maximum display brightness is corresponding to an N-th level of the N levels, the second display brightness is corresponding to an i-th level of the N levels, i is a positive integer smaller than or equal to N.

According to the claimed invention, the controlling unit judges whether the distance is larger than a third threshold when the distance is larger than the first threshold, the third threshold is larger than the first threshold, the third display brightness is corresponding to an (i+2)-th level of the N levels when the distance is larger than the third threshold and the second display brightness is smaller than the maximum display brightness, and the third display brightness is corresponding to an (i+1)-th level of the N levels when the distance is smaller than the third threshold and the second display brightness is smaller than the maximum display brightness.

According to the claimed invention, the controlling unit judges whether the distance is smaller than a fourth threshold when the distance is smaller than the second threshold, the fourth threshold is smaller than the second threshold, the third display brightness is corresponding to an (i−2)-th level of the N levels when the distance is smaller than the fourth threshold and the second display brightness is larger than the minimum display brightness, and the third display brightness is corresponding to an (i−1)-th level of the N levels when the distance is larger than the fourth threshold and the second display brightness is larger than the minimum display brightness.

According to the claimed invention, the display adjusting device further comprises an alarming unit electrically connected to the controlling unit, wherein the controlling unit controls the alarming unit to send out an alarm when the distance is larger than the first threshold and the second display brightness is equal to the maximum display brightness or when the distance is smaller than the second threshold and the second display brightness is equal to the minimum display brightness.

According to the claimed invention, a display adjusting method is adapted for adjusting display parameter (s) of a display unit. The display adjusting method comprises sensing an environmental illumination associated with the display unit; selectively adjusting a first display brightness of the display unit to a second display brightness according to the environmental illumination; capturing an image of a user in front of the display unit; calculating a distance between eyes of the user and the display unit according to the image; and selectively adjusting the second display brightness to a third display brightness according to the distance.

According to the claimed invention, the display adjusting method further comprises adjusting a color contrast of the display unit by a ratio of the third display brightness to the first display brightness.

According to the claimed invention, the display adjusting method further comprises judging whether the distance is larger than a first threshold or smaller than a second threshold, wherein the first threshold is larger than the second threshold; judging that the second display brightness is smaller than or equal to a maximum display brightness when the distance is larger than the first threshold, wherein the third display brightness is equal to the second display brightness when the second display brightness is equal to the maximum display brightness, and the third display brightness is larger than the second display brightness when the second display brightness is smaller than the maximum display brightness; judging that the second display brightness is larger than or equal to a minimum display brightness when the distance is smaller than the second threshold, wherein the third display brightness is equal to the second display brightness when the second display brightness is equal to the minimum display brightness, and the third display brightness is smaller than the second display brightness when the second display brightness is larger than the minimum display brightness; and setting the third display brightness to be equal to the second display brightness when the distance is between the first threshold and the second threshold.

According to the claimed invention, the display adjusting method further comprises providing a look-up table, wherein the look-up table records N predetermined environmental illumination and N predetermined display brightness, N is a positive integer, each of the N predetermined environmental illumination is corresponding to one of the N predetermined display brightness; and comparing the environmental illumination with the N predetermined environmental illumination of the look-up table so as to select the second display brightness from the N predetermined display brightness of the look-up table.

According to the claimed invention, the look-up table further records N levels, each of the N levels is corresponding to one of the N predetermined environmental illumination and one of the N predetermined display brightness, the minimum display brightness is corresponding to a first level of the N levels, the maximum display brightness is corresponding to an N-th level of the N levels, the second display brightness is corresponding to an i-th level of the N levels, i is a positive integer smaller than or equal to N.

According to the claimed invention, the display adjusting method further comprises judging whether the distance is larger than a third threshold when the distance is larger than the first threshold, wherein the third threshold is larger than the first threshold; setting the third display brightness to be corresponding to an (i+2)-th level of the N levels when the distance is larger than the third threshold and the second display brightness is smaller than the maximum display brightness; and setting the third display brightness to be corresponding to an (i+1)-th level of the N levels when the distance is smaller than the third threshold and the second display brightness is smaller than the maximum display brightness.

According to the claimed invention, the display adjusting method further comprises judging whether the distance is smaller than a fourth threshold when the distance is smaller than the second threshold, wherein the fourth threshold is smaller than the second threshold; setting the third display brightness to be corresponding to an (i−2)-th level of the N levels when the distance is smaller than the fourth threshold and the second display brightness is larger than the minimum display brightness; and setting the third display brightness to be corresponding to an (i−1)-th level of the N levels when the distance is larger than the fourth threshold and the second display brightness is larger than the minimum display brightness.

According to the claimed invention, the display adjusting method further comprises sending out an alarm when the distance is larger than the first threshold and the second display brightness is equal to the maximum display brightness or when the distance is smaller than the second threshold and the second display brightness is equal to the minimum display brightness.

As mentioned in the above, the display adjusting device and the display adjusting method of the invention are capable of adjusting the display brightness and the color contrast of the display unit according to the environmental illumination and the distance between the eyes of the user and the display unit. Furthermore, the invention can adjust the brightness and the color contrast of the display unit much more precisely according to a lot of thresholds when the distance between eyes of the user and the display unit varies. Moreover, once the display brightness of the display unit cannot be adjusted anymore (e.g. the display brightness has been adjusted to the maximum display brightness or the minimum display brightness), the invention will send out the alarm (e.g. text, audio, flash, vibration, etc.) to notify the user. Accordingly, the invention can prevent the eyes of the user from getting tired or even getting permanent injury effectively after watching the display unit for a long time.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
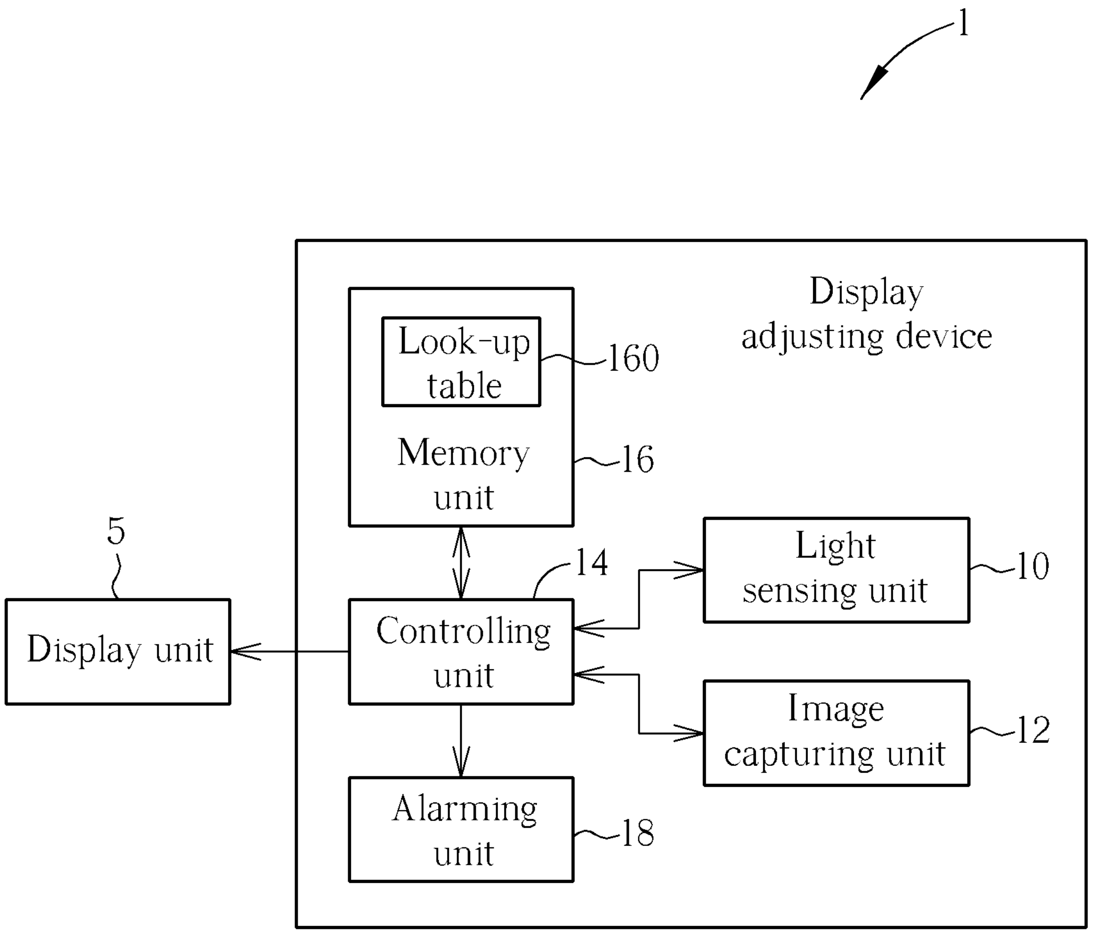
FIG. 1 is a functional block diagram illustrating a display adjusting device and a display unit according to an embodiment of the invention.
Figure 2:
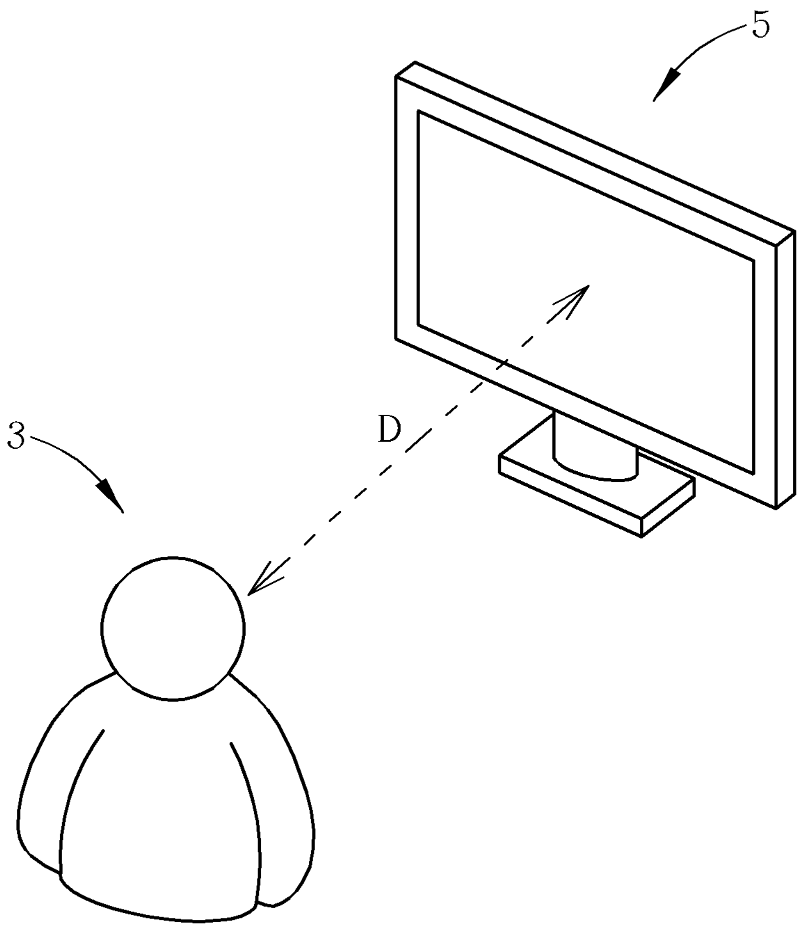
FIG. 2 is a schematic diagram illustrating a user and the display unit.

Referring to FIGS. 1 and 2, FIG. 1 is a functional block diagram illustrating a display adjusting device 1 and a display unit 5 according to an embodiment of the invention, FIG. 2 is a schematic diagram illustrating a user 3 and the display unit 5. As shown in FIG. 1, the display adjusting device 1 comprises a light sensing unit 10, an image capturing unit 12, a controlling unit 14, a memory unit 16 and an alarming unit 18, wherein the controlling unit 14 is electrically connected to the light sensing unit 10, the image capturing unit 12, the memory unit 16 and the alarming unit 18. The display adjusting device 1 is adapted for adjusting display parameter(s) of the display unit 5 (e.g. display brightness, color contrast, etc.), wherein the controlling unit 14 of the display adjusting device 1 is also electrically connected to the display unit 5. In this embodiment, the display adjusting device 1 and the display unit 5 may be integrated in one single electronic device, such as notebook, tablet computer, mobile phone, personal digital assistant, and so on. At this time, the display unit 5 may be a display of the electronic device. In another embodiment, the display adjusting device 1 and the display unit 5 may be manufactured independently. In another embodiment, the light sensing unit 10, the image capturing unit 12 and the alarming unit 18 of the display adjusting device 1 may be installed in the display unit 5, and the controlling unit 14 and the memory unit 16 of the display adjusting device 1 may be installed in a computer host (not shown).

In practical applications, the light sensing unit 10 may be a light sensor; the image capturing unit 12 may be a charge coupled device (CCD) image sensor or a complementary metal oxide semiconductor (CMOS) image sensor; the controlling unit 14 may be a controller or a processor capable of calculating and processing data; the memory unit 16 may be a non-volatile memory (e.g. flash memory) or other data storage devices; the alarming unit 18 may be a display, a speaker, a light emitting device, a vibrating motor or other devices capable of performing text, audio, flash and/or vibration.

In this embodiment, the memory unit 16 stores a look-up table 160, as shown in FIG. 1. Referring to the following table 1, table 1 is an embodiment of the look-up table 160 shown in FIG. 1. As shown in the following table 1, the look-up table 160 may record N levels, N predetermined environmental illumination and N predetermined display brightness, wherein N is a positive integer. Each of the levels is corresponding to one of the predetermined environmental illumination and one of the predetermined display brightness, wherein the unit of the predetermined environmental illumination is represented by lux and the unit of the predetermined display brightness is represented by nits. It should be noted that the predetermined environmental illumination may be a specific value or a range. For example, the predetermined environmental illumination may be about 50 lux in a living room and the predetermined display brightness may be set to 79.39 nits correspondingly; the predetermined environmental illumination may be between 320 lux and 500 lux in an office and the predetermined display brightness may be set to 156.6 nits correspondingly. The look-up table 160 may be established according to practical applications and is not limited to the aforesaid embodiment.

TABLE 1

Look-up table 160

| Level | Predetermined environmental illumination (lux) | Predetermined display brightness (nits) |
|---|---|---|
| 1 | L_1 | B_1 |
| 2 | L_2 | B_2 |
| 3 | L_3 | B_3 |
| 4 | L_4 | B_4 |
| 5 | L_5 | B_5 |
| . . . | . . . | . . . |
| N | L_N | B_N |

Figure 3A:
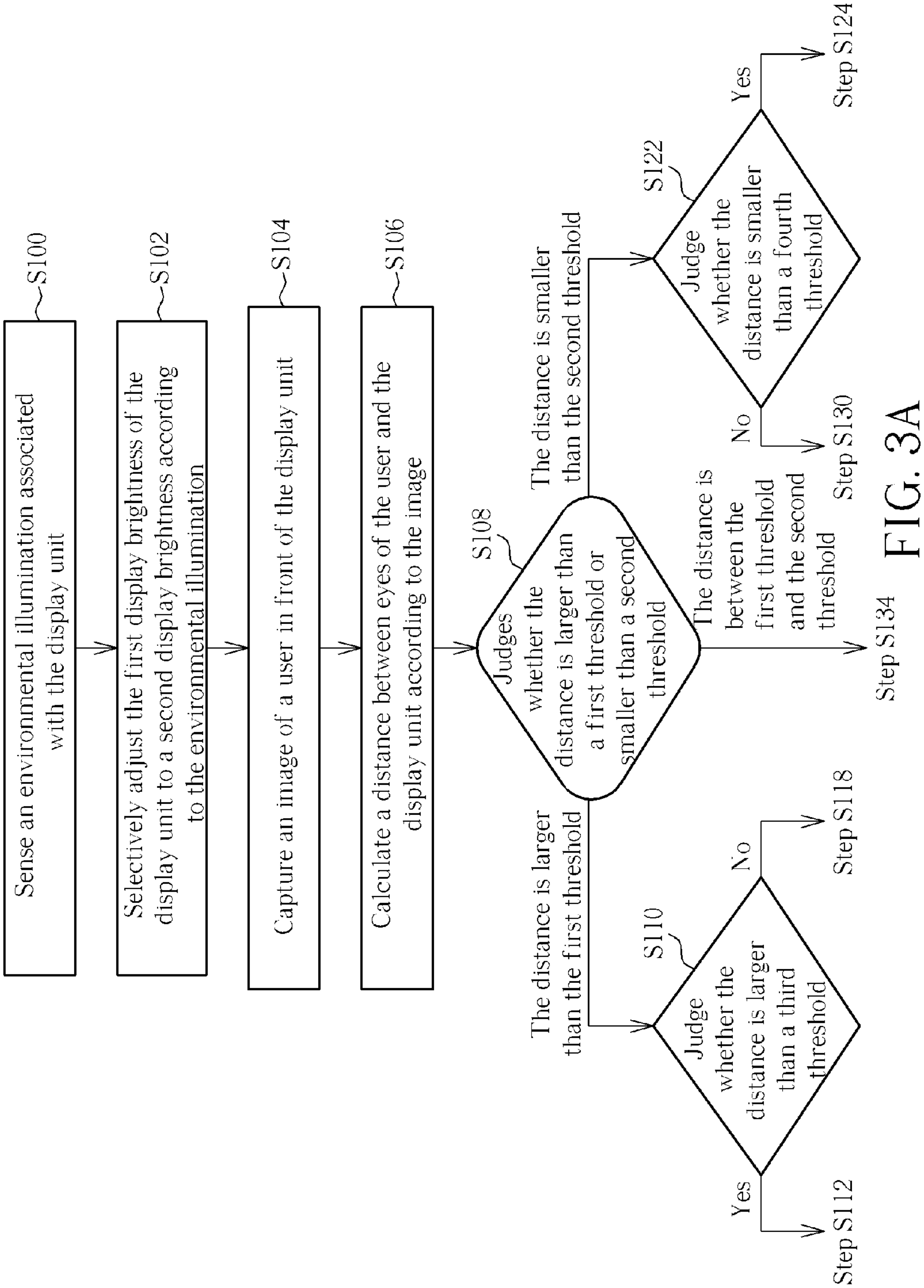
FIGS. 3A and 3B are flowcharts illustrating a display adjusting method according to one embodiment of the invention.
Figure 3B:
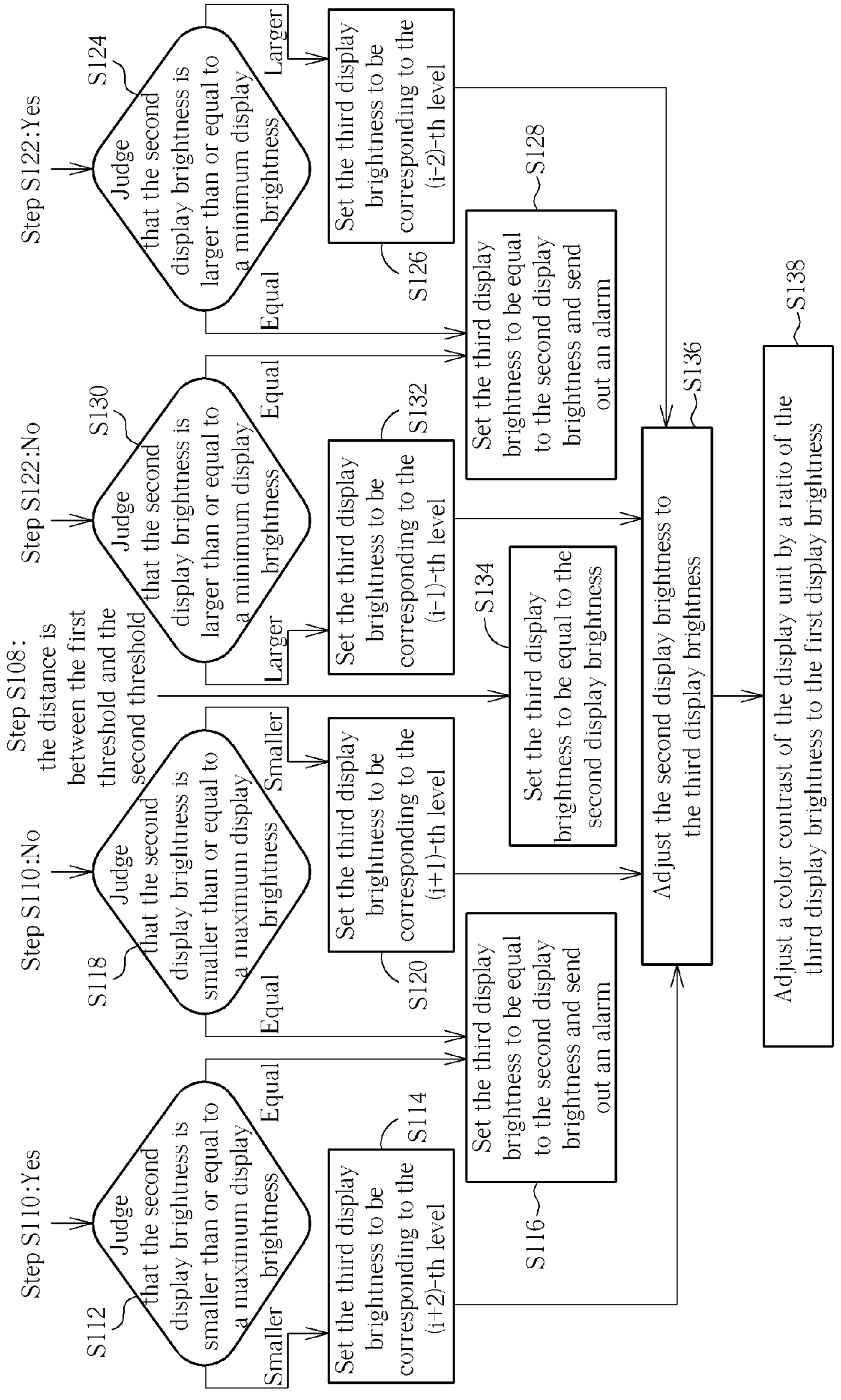

Referring to FIGS. 3A and 3B, FIGS. 3A and 3B are flowcharts illustrating a display adjusting method according to one embodiment of the invention. The display adjusting method shown in FIGS. 3A and 3B may be implemented by software and hardware. The display adjusting method shown in FIGS. 3A and 3B will be described in the following together with FIGS. 1, 2 and table 1.

It is assumed that the display unit 5 is displaying images with a first display brightness. First of all, in step S100, the light sensing unit 10 senses an environmental illumination associated with the display unit 5. Afterward, in step S102, the controlling unit 14 selectively adjusts the first display brightness of the display unit 5 to a second display brightness according to the environmental illumination. For example, if the first display brightness is B_3 and the environmental illumination is L_4, the second display brightness will be B_4; if the first display brightness is B_3 and the environmental illumination is L_3, the second display brightness will be B_3; and so on. Therefore, the controlling unit 14 compares the environmental illumination sensed by the light sensing unit 10 with the predetermined environmental illumination of the look-up table 160 so as to select the second display brightness from the predetermined display brightness of the look-up table 160 correspondingly.

Afterward, in step S104, the image capturing unit 12 captures an image of a user 3 in front of the display unit 5. Afterward, in step S106, the controlling unit 14 calculates a distance D between eyes of the user 3 and the display unit 5 according to the image. In practical applications, the distance D may be obtained by eye-tracking technology. Afterward, in step S108, the controlling unit 14 judges whether the distance D is larger than a first threshold or smaller than a second threshold, wherein the first threshold is larger than the second threshold. In general, when the distance D is between 50 cm and 87 cm and the display brightness of the display unit 5 is set to 50% under common environmental illumination, the user 3 may feel more comfortable while watching the display unit 5. Therefore, in this embodiment, the first threshold may be set, but not limited, to 87 cm and the second threshold may be set, but not limited, to 50 cm. In other words, the first threshold and the second threshold may be also set to other values according to practical applications.

If the controlling unit 14 judges that the distance D is larger than the first threshold in step S108, the controlling unit 14 then judges whether the distance D is larger than a third threshold in step S110, wherein the third threshold is larger than the first threshold. In this embodiment, the third threshold may be set, but not limited, to 100 cm. In other words, the third threshold may be also set to other values according to practical applications. If the controlling unit 14 judges the distance D is larger than the third threshold, the controlling unit 14 then judges that the second display brightness is smaller than or equal to a maximum display brightness (step S112). In this embodiment, the maximum display brightness is corresponding to the N-th level of the look-up table 1 and the second display brightness is corresponding to the i-th level of the look-up table 1, wherein i is a positive integer smaller than or equal to N. If the controlling unit 14 judges that the second display brightness is smaller than the maximum display brightness (i.e. i<N), the controlling unit 14 sets the third display brightness to be corresponding to the (i+2)-th level of the look-up table 1 (step S114). For example, if the second display brightness is B_3 corresponding to the third level and N is equal to 10, the third display brightness is corresponding to the fifth level. Therefore, the controlling unit 14 will adjust the second display brightness B_3 to the third display brightness B_5 (step S136). If the controlling unit 14 judges that the second display brightness is equal to the maximum display brightness (i.e. i=N), the controlling unit 14 then sets the third display brightness to be equal to the second display brightness in step S116 (i.e. the third display brightness is also equal to the maximum display brightness) and controls the alarming unit 18 to send out an alarm so as to notify the user that the display brightness of the display unit 5 cannot be adjusted to a higher level anymore. It should be noted that if N is equal to 10 and the second display brightness is B_9 corresponding to the ninth level, the controlling unit 14 will also set the third display brightness to the maximum display brightness and control the alarming unit 18 to send out the alarm to notify the user that the display brightness of the display unit 5 cannot be adjusted to a higher level anymore. Accordingly, the user can adjust the distance D between himself/herself and the display unit 5 based on the alarm.

If the controlling unit 14 judges that the distance D is not larger than the third threshold in step S110, the controlling unit 14 then judges that the second display brightness is smaller than or equal to a maximum display brightness in step S118. If the controlling unit 14 judges that the second display brightness is smaller than the maximum display brightness (i.e. i<N), the controlling unit 14 sets the third display brightness to be corresponding to the (i+1)-th level of the look-up table 1 (step S120). For example, if the second display brightness is B_3 corresponding to the third level and N is equal to 10, the third display brightness is corresponding to the fourth level. Therefore, the controlling unit 14 will adjust the second display brightness B_3 to the third display brightness B_4 (step S136). If the controlling unit 14 judges that the second display brightness is equal to the maximum display brightness (i.e. i=N), the controlling unit 14 then sets the third display brightness to be equal to the second display brightness in step S116 (i.e. the third display brightness is also equal to the maximum display brightness) and controls the alarming unit 18 to send out an alarm so as to notify the user that the display brightness of the display unit 5 cannot be adjusted to a higher level anymore. Accordingly, the user can adjust the distance D between himself/herself and the display unit 5 based on the alarm.

If the controlling unit 14 judges that the distance D is smaller than the second threshold in step S108, the controlling unit 14 then judges whether the distance D is smaller than a fourth threshold in step S122, wherein the fourth threshold is smaller than the second threshold. In this embodiment, the fourth threshold may be set, but not limited, to 25 cm. In other words, the fourth threshold may be also set to other values according to practical applications. If the controlling unit 14 judges the distance D is smaller than the fourth threshold, the controlling unit 14 then judges that the second display brightness is larger than or equal to a minimum display brightness (step S124). In this embodiment, the minimum display brightness is corresponding to the first level of the look-up table 1 and the second display brightness is corresponding to the i-th level of the look-up table 1, wherein i is a positive integer smaller than or equal to N. If the controlling unit 14 judges that the second display brightness is larger than the minimum display brightness (i.e. i>1), the controlling unit 14 sets the third display brightness to be corresponding to the (i−2)-th level of the look-up table 1 (step S126). For example, if the second display brightness is B_3 corresponding to the third level and N is equal to 10, the third display brightness is corresponding to the first level. Therefore, the controlling unit 14 will adjust the second display brightness B_3 to the third display brightness B_1 (step S136). If the controlling unit 14 judges that the second display brightness is equal to the minimum display brightness (i.e. i=1), the controlling unit 14 then sets the third display brightness to be equal to the second display brightness in step S128 (i.e. the third display brightness is also equal to the minimum display brightness) and controls the alarming unit 18 to send out an alarm so as to notify the user that the display brightness of the display unit 5 cannot be adjusted to a lower level anymore. It should be noted that if the second display brightness is B_2 corresponding to the second level, the controlling unit 14 will also set the third display brightness to the minimum display brightness and control the alarming unit 18 to send out the alarm to notify the user that the display brightness of the display unit 5 cannot be adjusted to a lower level anymore. Accordingly, the user can adjust the distance D between himself/herself and the display unit 5 based on the alarm.

If the controlling unit 14 judges that the distance D is not smaller than the fourth threshold in step S122, the controlling unit 14 then judges that the second display brightness is larger than or equal to a minimum display brightness in step S130. If the controlling unit 14 judges that the second display brightness is larger than the minimum display brightness (i.e. i>1), the controlling unit 14 sets the third display brightness to be corresponding to the (i−1)-th level of the look-up table 1 (step S132). For example, if the second display brightness is B_3 corresponding to the third level and N is equal to 10, the third display brightness is corresponding to the second level. Therefore, the controlling unit 14 will adjust the second display brightness B_3 to the third display brightness B_2 (step S136). If the controlling unit 14 judges that the second display brightness is equal to the minimum display brightness (i.e. i=N), the controlling unit 14 then sets the third display brightness to be equal to the second display brightness in step S128 (i.e. the third display brightness is also equal to the minimum display brightness) and controls the alarming unit 18 to send out an alarm so as to notify the user that the display brightness of the display unit 5 cannot be adjusted to a lower level anymore. Accordingly, the user can adjust the distance D between himself/herself and the display unit 5 based on the alarm.

If the controlling unit 14 judges that the distance D is between the first threshold and the second threshold in step S108, the controlling unit 14 then sets the third display brightness to be equal to the second display brightness in step S134. For example, if the second display brightness is B_3, the third display brightness is also B_3. In other words, when the distance D is between the first threshold and the second threshold, the display brightness of the display unit 5 will not be adjusted.

After adjusting the display brightness of the display unit 5, the controlling unit 14 may adjust a color contrast of the display unit 5 by a ratio of the third display brightness to the first display brightness (step S138). For example, if the third display brightness is B_5 and the first display brightness is B_3, the controlling unit 14 may multiply gray levels of R, G and B outputted by the display unit 5 by B_5/B_3 so as to adjust the color contrast of the display unit 5. Furthermore, the controlling unit 14 may also adjust the color contrast of the display unit 5 by a ratio of the level of the third display brightness to the level of the first display brightness. For example, if the level of the third display brightness is 5 and the level of the first display brightness is 3, the controlling unit 14 will multiply gray levels R, G and B outputted by the display unit 5 by 5/3 so as to adjust the color contrast of the display unit 5.

Moreover, the invention may only utilize the aforesaid first and second thresholds to adjust the display brightness and/or the color contrast of the display unit or may utilize more than four thresholds to adjust the display brightness and/or the color contrast of the display unit. As to the number of the thresholds and the corresponding adjustment, it can be determined and implemented according to the aforesaid embodiment of the display adjusting method in similar manner.

Compared to the prior art, the display adjusting device and the display adjusting method of the invention are capable of adjusting the display brightness and the color contrast of the display unit according to the environmental illumination and the distance between the eyes of the user and the display unit.

Furthermore, the invention can adjust the brightness and the color contrast of the display unit much more precisely according to a lot of thresholds when the distance between eyes of the user and the display unit varies. Moreover, once the display brightness of the display unit cannot be adjusted anymore (e.g. the display brightness has been adjusted to the maximum display brightness or the minimum display brightness), the invention will send out the alarm (e.g. text, audio, flash, vibration, etc.) to notify the user. Accordingly, the invention can prevent the eyes of the user from getting tired or even getting permanent injury effectively after watching the display unit for a long time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A display adjusting device adapted for adjusting display parameter(s) of a display unit comprising:

a light sensing unit for sensing an environmental illumination associated with the display unit;

an image capturing unit for capturing an image of a user in front of the display unit; and a controlling unit, electrically connected to the display unit, the light sensing unit and the image capturing unit, for selectively adjusting a first display brightness of the display unit to a second display brightness according to the environmental illumination, calculating a distance between eyes of the user and the display unit according to the image, and selectively adjusting the second display brightness to a third display brightness according to the distance;

wherein the controlling unit judges whether the distance is larger than a first threshold or smaller than a second threshold, the first threshold is larger than the second threshold; the controlling unit judges that the second display brightness is smaller than or equal to a maximum display brightness when the distance is larger than the first threshold, the third display brightness is equal to the second display brightness when the second display brightness is equal to the maximum display brightness, the third display brightness is larger than the second display brightness when the second display brightness is smaller than the maximum display brightness; the controlling unit judges that the second display brightness is larger than or equal to a minimum display brightness when the distance is smaller than the second threshold, the third display brightness is equal to the second display brightness when the second display brightness is equal to the minimum display brightness, the third display brightness is smaller than the second display brightness when the second display brightness is larger than the minimum display brightness; the third display brightness is equal to the second display brightness when the distance is between the first threshold and the second threshold.

2. The display adjusting device of claim 1, wherein the controlling unit adjusts a color contrast of the display unit by a ratio of the third display brightness to the first display brightness.

3. The display adjusting device of claim 1, further comprising a memory unit, electrically connected to the controlling unit, for storing a look-up table, wherein the look-up table records N predetermined environmental illumination and N predetermined display brightness, N is a positive integer, each of the N predetermined environmental illumination is corresponding to one of the N predetermined display brightness, the controlling unit compares the environmental illumination with the N predetermined environmental illumination of the look-up table so as to select the second display brightness from the N predetermined display brightness of the look-up table.

4. The display adjusting device of claim 3, wherein the look-up table further records N levels, each of the N levels is corresponding to one of the N predetermined environmental illumination and one of the N predetermined display brightness, the minimum display brightness is corresponding to a first level of the N levels, the maximum display brightness is corresponding to an N-th level of the N levels, the second display brightness is corresponding to an i-th level of the N levels, i is a positive integer smaller than or equal to N.

5. The display adjusting device of claim 4, wherein the controlling unit judges whether the distance is larger than a third threshold when the distance is larger than the first threshold, the third threshold is larger than the first threshold, the third display brightness is corresponding to an (i+2)-th level of the N levels when the distance is larger than the third threshold and the second display brightness is smaller than the maximum display brightness, and the third display brightness is corresponding to an (i+1)-th level of the N levels when the distance is smaller than the third threshold and the second display brightness is smaller than the maximum display brightness.

6. The display adjusting device of claim 4, wherein the controlling unit judges whether the distance is smaller than a fourth threshold when the distance is smaller than the second threshold, the fourth threshold is smaller than the second threshold, the third display brightness is corresponding to an (i−2)-th level of the N levels when the distance is smaller than the fourth threshold and the second display brightness is larger than the minimum display brightness, and the third display brightness is corresponding to an (i−1)-th level of the N levels when the distance is larger than the fourth threshold and the second display brightness is larger than the minimum display brightness.

7. The display adjusting device of claim 1, further comprising an alarming unit electrically connected to the controlling unit, wherein the controlling unit controls the alarming unit to send out an alarm when the distance is larger than the first threshold and the second display brightness is equal to the maximum display brightness or when the distance is smaller than the second threshold and the second display brightness is equal to the minimum display brightness.

8. A display adjusting method adapted for adjusting display parameter(s) of a display unit comprising:

sensing an environmental illumination associated with the display unit;

selectively adjusting a first display brightness of the display unit to a second display brightness according to the environmental illumination;

capturing an image of a user in front of the display unit;

calculating a distance between eyes of the user and the display unit according to the image; and selectively adjusting the second display brightness to a third display brightness according to the distance;

wherein the display adjusting method further comprises:

judging whether the distance is larger than a first threshold or smaller than a second threshold, wherein the first threshold is larger than the second threshold;

judging that the second display brightness is smaller than or equal to a maximum display brightness when the distance is larger than the first threshold, wherein the third display brightness is equal to the second display brightness when the second display brightness is equal to the maximum display brightness, and the third display brightness is larger than the second display brightness when the second display brightness is smaller than the maximum display brightness;

judging that the second display brightness is larger than or equal to a minimum display brightness when the distance is smaller than the second threshold, wherein the third display brightness is equal to the second display brightness when the second display brightness is equal to the minimum display brightness, and the third display brightness is smaller than the second display brightness when the second display brightness is larger than the minimum display brightness; and setting the third display brightness to be equal to the second display brightness when the distance is between the first threshold and the second threshold.

9. The display adjusting method of claim 8, further comprising:

adjusting a color contrast of the display unit by a ratio of the third display brightness to the first display brightness.

10. The display adjusting method of claim 8, further comprising:

providing a look-up table, wherein the look-up table records N predetermined environmental illumination and N predetermined display brightness, N is a positive integer, each of the N predetermined environmental illumination is corresponding to one of the N predetermined display brightness; and comparing the environmental illumination with the N predetermined environmental illumination of the look-up table so as to select the second display brightness from the N predetermined display brightness of the look-up table.

11. The display adjusting method of claim 10, wherein the look-up table further records N levels, each of the N levels is corresponding to one of the N predetermined environmental illumination and one of the N predetermined display brightness, the minimum display brightness is corresponding to a first level of the N levels, the maximum display brightness is corresponding to an N-th level of the N levels, the second display brightness is corresponding to an i-th level of the N levels, i is a positive integer smaller than or equal to N.

12. The display adjusting method of claim 11, further comprising:

judging whether the distance is larger than a third threshold when the distance is larger than the first threshold, wherein the third threshold is larger than the first threshold;

setting the third display brightness to be corresponding to an (i+2)-th level of the N levels when the distance is larger than the third threshold and the second display brightness is smaller than the maximum display brightness; and setting the third display brightness to be corresponding to an (i+1)-th level of the N levels when the distance is smaller than the third threshold and the second display brightness is smaller than the maximum display brightness.

13. The display adjusting method of claim 11, further comprising:

judging whether the distance is smaller than a fourth threshold when the distance is smaller than the second threshold, wherein the fourth threshold is smaller than the second threshold;

setting the third display brightness to be corresponding to an (i−2)-th level of the N levels when the distance is smaller than the fourth threshold and the second display brightness is larger than the minimum display brightness; and setting the third display brightness to be corresponding to an (i−1)-th level of the N levels when the distance is larger than the fourth threshold and the second display brightness is larger than the minimum display brightness.

14. The display adjusting method of claim 8, further comprising:

sending out an alarm when the distance is larger than the first threshold and the second display brightness is equal to the maximum display brightness or when the distance is smaller than the second threshold and the second display brightness is equal to the minimum display brightness.

* * * * *